Nov. 16, 1948.                W. I. SMITH                2,453,819
            POWER LAWN MOWER AND CONTROL MECHANISM THEREFOR
                          Filed Dec. 20, 1946
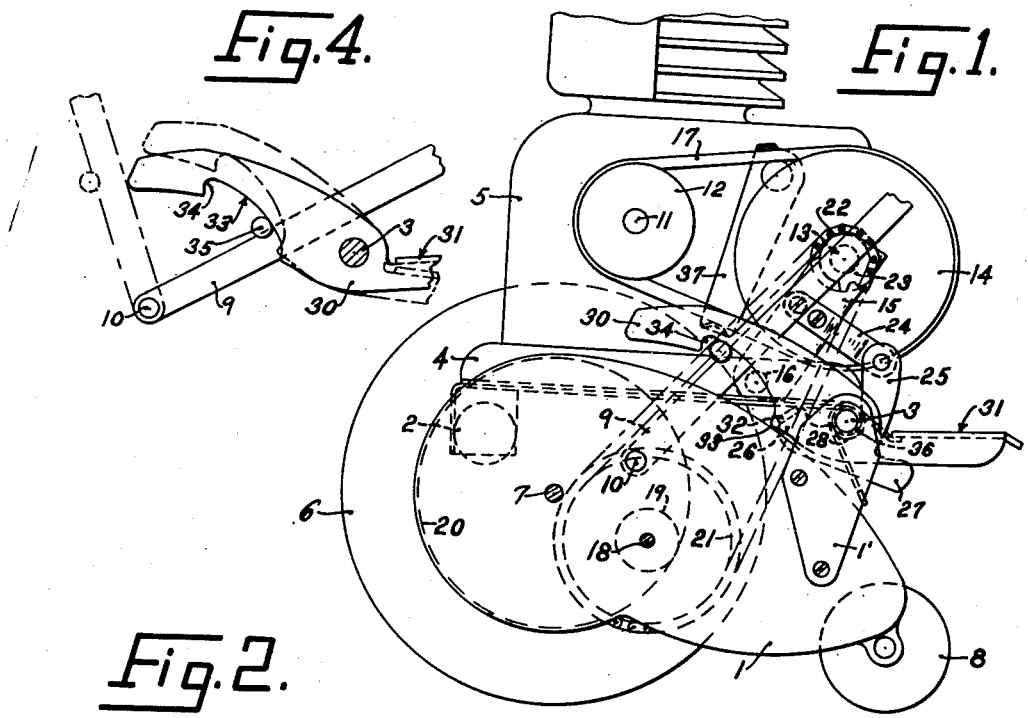
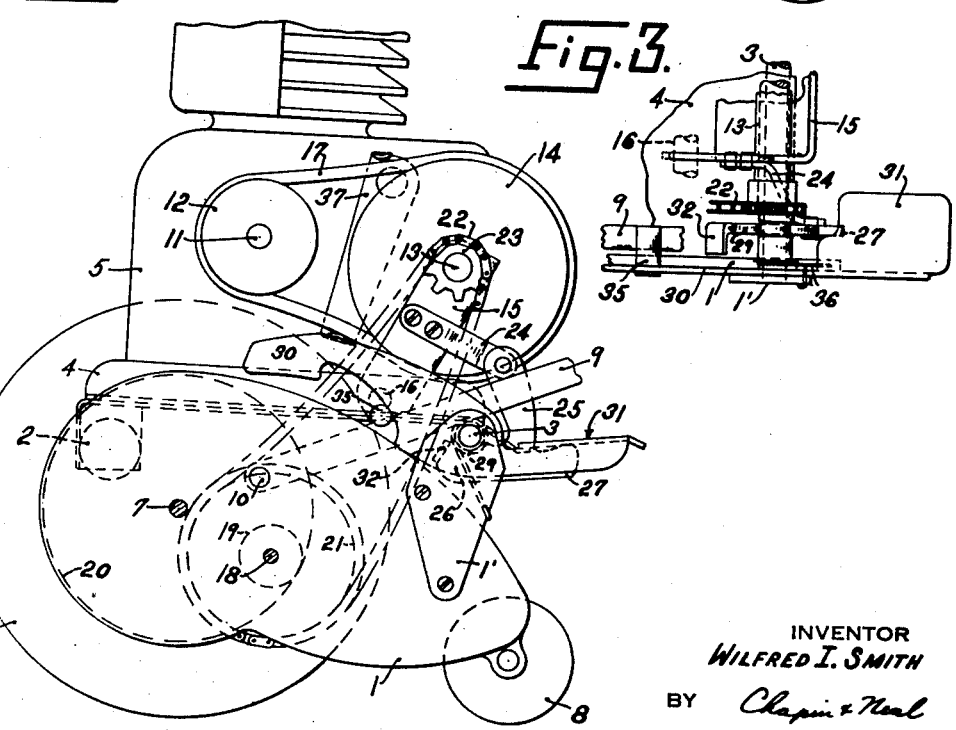
INVENTOR
WILFRED I. SMITH
BY Chapin & Neal
ATTORNEYS Patented Nov. 16, 1948

2,453,819

UNITED STATES PATENT OFFICE 2,453,819

POWER LAWN MOWER AND CONTROL MECHANISM THEREFOR

Wilfred I. Smith, Chicopee Falls, Mass., assignor to Savage Arms Corporation, Utica, N. Y., a corporation of Delaware Application December 20, 1946, Serial No. 717,457

11 Claims. (Cl. 180—19)

This invention relates to power driven lawn mowers and machines of similar character and more particularly to the driving control for said machines.

The machines to which this invention is adapted are those which comprise a power driven tractor assembly guided by an operator walking behind the machine through the manipulation of a guiding handle.

An object of the invention is to provide a control means for the power drive whereby the operator may throw the drive "on" by a foot pedal and may throw the drive "off" by depressing the guiding handle to a lower position. Except for this lowered position of the handle for throwing off the drive, the handle is free to be normally swung up and down in guiding the machine.

A further feature of improvement resides in a manually controlled stop which normally prevents the handle from being swung too high in a vertical direction, but which may be thrown out of action by the foot pedal and permit swinging of the handle to vertical position with respect to the machine so that it may be conveniently stored or parked in a relatively small space.

Further advantages and improvements will become apparent from the following more detailed description taken in connection with the accompanying drawing, in which:

Fig. 1 is a side elevation of a power driven lawn mower showing the drive in "on" position;

Fig. 2 is a similar view showing the drive in "off" position;

Fig. 3 is a detail plan of the foot pedal and associated parts; and

Fig. 4 is a fragmentary view showing the action of the parking hook in relation to the guide handle.

For purposes of illustration the present invention is shown in its application to a power drive for a hand guided lawn mower machine and only so much of the details of said lawn mower are herein shown as are necessary for the understanding of the application of the invention thereto.

Referring to said drawing, the main frame of the lawn mower is of the usual construction and is constituted by side plates one of which is indicated at 1, joined together by transverse tie rods 2 and 3, and having an upper flat platform or deck 4 for support of the motor 5 firmly fixed thereto. A bracket 1' riveted to the side plate 1 provides the mounting for one end of the rear tie rod 3 as shown. The front traction wheels 6 for the machine are mounted in the frame as indicated by the shaft at 7, the near wheel not appearing on the drawing. A rear ground roller 8 is also carried between the side plates of said frame in the usual manner. A guiding handle for the machine comprises the usual bifurcated arms pivoted to the side plates of the frame and the left hand branch of said handle is partially shown at 9 pivoted at 10 to the plate 1.

The motor shaft 11 has fixed thereto the driving pulley 12 and a jack shaft 13 has fixed thereto a driven pulley 14. The jack shaft 13 is carried at the upper end of a rock frame 15 which is pivoted at 16 on the deck of the main frame so that a swinging movement of said rock frame 15 will cause shaft 13 to approach or recede from the drive shaft 11. A V belt 17 connects said pulleys 12 and 14 for the transmission of power therebetween.

In the present embodiment the traction wheels 6 are driven from the reel shaft 18 by an internal gear drive as indicated in dotted lines at 19 and 20. It will be understood that the reel shaft 18 carries the rotary cutter or reel (not shown) of the mower. The reel shaft also has fastened thereto the large sprocket 21 which is driven through chain 22 from sprocket 23 fixed to the jack shaft 13. It will be observed that the mounting of the jack shaft 13 on rock frame 15 is so positioned that a slight swinging of said rock frame back and forth will not appreciably lengthen the distance between the jack shaft 13 and reel shaft 18 whereby the tension on the driving chain 22 is not appreciably disturbed by said rocking movement. It will also be appreciated that when the rock frame 15 is swung clockwise it will tighten the belt 17 for a driving condition, and that when swung anti-clockwise it will correspondingly loosen the belt for a non-driving condition. In other words, the rock frame 15 serves as a belt tightener to throw the transmission "on" or "off." A suitable belt guide 37 fixed to the main frame serves to retain the belt 17 always in engagement with the grooves of pulleys 12 and 14.

The present invention provides for convenient means to render the drive from the motor 5 to the reel shaft 18 and the traction wheels 6 operative or inoperative at the will of the operator while the motor continues to run, and in the present embodiment this is accomplished by shifting the belt tightener above described. The shifting to "on" position for driving is brought about by the depression of a foot pedal, and the shifting to "off" position for non-driving is made to occur only when the guiding handle is swung to its lowermost position. This arrangement gives perfect control of the machine by the operator who may thus keep a firm grip on the handle at all times and also be able to swing the handle freely up and down for guiding the machine. The mechanism for shifting the belt tightener to "on" and "off" positions will now be described.

The rock frame 15 has a rearwardly projecting arm 24 projecting rearwardly therefrom and on the outer end of which is pivotally hung a latch 25. This latch is shaped somewhat like an inverted T and has a lower forward branch 26 and lower rear branch 27. The branch 26 is formed with a pair of seating recesses or notches 28, 29 adapted to engage with the tie rod 3 of the main frame which serves as a keeper for the latch 25 in retaining its position thereon.

When the said latch 25 is pressed downwardly and forwardly, the notch 28 makes holding engagement with the keeper 3 and in so doing causes the rock frame 15 to swing clockwise for a tight belt as clearly shown in Fig. 1. When the latch is pressed down and to the rear from the position shown in Fig. 1, the notch 29 makes holding engagement with the keeper 3 and the rock frame 15 is swung anti-clockwise to provide a loose belt. The latch 25 is hung in such manner that it tends to be retained in whatever position it may be set with respect to keeper 3 until it is forcibly shifted. The notch 28 of latch 25 may be termed the "on" notch since when engaged the drive is held in "on" position, and the notch 29 may be termed the "off" notch, since its engagement signifies that the drive is "off." It will be appreciated that the tension of belt 17 tends to swing rock frame 15 to non-drive position whenever the "on" notch 28 is released from its keeper 3.

The means for operating latch 25 in the manner described is preferably in the form of a foot pedal lever 30 pivotally mounted on the tie rod 3 adjacent the latch 25 and having a flat treadle portion 31 at the rear end thereof, see Fig. 3 which overhangs the rearward lower arm 27 of the latch 25. The forward end of lower arm 26 of said latch is also formed with a horizontally turned lip 32 which lies in the path of the swinging handle 9. A spring 36 mounted on the tie rod 3 as shown tends to keep the rear treadle portion 31 in its upward position. A stop shoulder 33 on the pedal lever 30 engages side plate 1 as shown to limit the upward throw of said treadle 31. The pedal lever 30 also has an integral forward extension in the form of a hook 34 which normally lies in the path of a stop lug 35 carried by the handle 9 and which may be displaced therefrom for a parking purpose as hereinafter described.

The operation of the control mechanism is as follows: Assuming the parts are as shown in Fig. 1 with the latch 25 in "on" position and the belt 17 in driving condition; if the operator wishes to stop the drive he swings the handle 9 to its lowermost position whereby said handle will engage and press downwardly upon lip 32 on the forward end of latch 25 and shift the latter downwardly and rearwardly to engage the "off" notch 29 with its keeper or tie rod 3. This action will permit the rock frame 15 to swing slightly forward and loosen the belt 17 for the non-drive or "off" condition, as shown in Fig. 2 of the drawing.

When the operator desires to shift to "on" condition for driving, he steps on the foot treadle 31 and depresses it far enough to throw the latch 25 downwardly and forwardly for engaging its "on" notch 28 with said keeper or tie rod 3. This engaging movement of the latch 25 will pull the rock frame 15 slightly to the rear and tighten the belt for the driving condition shown in Fig. 1 and the parts will be retained in this driving condition by latch 25 until released by a manipulation of the handle 9 to its lowermost position as previously described.

In the operation of guiding a lawn mower it is desirable to have a free swinging handle as above described. But preferably the said handle should be prevented from swinging too far upwardly so that it may be useful as a brace in holding the machine from rolling backwards on an incline. For this purpose the forward end of the pedal lever 30 is provided with its hook 34 which is normally in position to engage the lug 35 on the handle 9 as shown in solid lines in Fig. 4, and thus limit the upward swinging of handle 9. On the other hand it is sometimes desirable in parking or storing the machine in a narrow space to be able to move the handle 9 into its vertical position with respect to the machine. For this purpose the hook 34 is formed so as to easily be manipulated by the foot lever 31 and be moved to dotted line position (Fig. 4) out of the path of the lug 35 on said handle 9. This will allow the handle to be swung to its vertical position for parking.

What I claim is:

1. Control mechanism for the belt transmission of power driven lawn movers and the like comprising in combination, a wheel supported main frame, a guiding handle pivotally connected to said frame for free swinging movement between up and down positions, said frame carrying thereon a motor and its drive shaft and also carrying a shaft for being driven thereby, a releasable driving connection between said motor shaft and driven shaft, means to shift said connection to operative condition for driving and to inoperative conditon for non-driving, a foot pedal operable through said shifting means to shift said driving connection into its operative condition, said shifting means being operable by said guiding handle to shift said driving connection to its inoperative condition.

2. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a shaft for being driven thereby, a releasable driving connection between said shafts, means to shift said connection to operative condition for driving and to inoperative condition for non-driving, a foot pedal pivotally mounted on said main frame to operate said means to shift said driving connection into its operative condition, said shifting means being positioned for operation by said guiding handle only in the lowermost part of its downward movement to shift said driving connection to its inoperative condition.

3. Control mechanism for the belt transmission of power driven lawn mowers and the like comprising in combination, a wheel supported main frame, a guiding handle pivotally connected between said frame for free swinging movement between up and down positions, said frame carrying thereon a motor and its drive shaft and also carrying a driven shaft with belt and pulley transmission between said motor and driven shafts, a belt tightener shiftable to "on" position wherein said belt is tight for driving, and to "off" position wherein said belt is loose for non-driving, a foot pedal and means operated thereby to shift said belt tightener to its "on" position, said means being operable by said guiding handle to shift said belt tightener to its "off" position.

4. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft, and also carrying a driven shaft with belt and pulley transmission between said motor and driven shafts, a belt tightener shiftable to "on" position wherein said belt is tight for driving, and to "off" position wherein said belt is loose for non-driving, a foot pedal pivotally mounted on the main frame and means operated thereby to shift said belt tightener to its "on" position, said means being positioned for operation by said guiding handle only in the lowermost part of its downward movement to shift said belt tightener to its "off" position.

5. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said motor and driven shafts, a belt tightener shiftable to "on" position wherein said belt is tight for driving, and to "off" position wherein said belt is loose for non-driving, a foot pedal and means operated thereby to shift said belt tightener to its "on" position, said means being operable by said guiding handle to shift said belt tightener to its "off" position, said means including a keeper for retaining said belt tightener in position when shifted.

6. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said motor and driven shafts, a belt tightener shiftable to "on" position wherein said belt is tight for driving, and to "off" position wherein said belt is loose for non-driving, a foot pedal pivotally mounted on the main frame and means operated thereby to shift said belt tightener to its "on" position, a keeper for retaining said belt tightener in its "on" position when shifted thereto, said means being positioned for operation by said guiding handle only in the lowermost part of its downward movement to release said retaining means and shift said belt tightener to its "off" position.

7. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said shafts, a belt tightener shiftable to "on" position wherein said belt is tight for driving, and to "off" position wherein said belt is loose for non-driving, latching means adapted when actuated to shift said belt tightener into "on" position and to retain the same therein, a foot pedal arranged to thus actuate said latching means, said latching means being operable by the guiding handle to release said latching means and shift said belt tightener to "off" position.

8. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said shafts, a belt tightener shiftable to "on" position wherein said belt is tight for driving, and to "off" position wherein said belt is loose for non-driving, latching means adapted when actuated to shift said belt tightener into "on" position and to retain the same therein, a foot pedal arranged to thus actuate said latching means, said latching means being positioned for operation by said guiding handle only in the lowermost part of its downward movement, to release said latching means and shift said belt tightener to its "off" position.

9. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said shafts, a belt tightener shiftable to "on" position wherein said belt is tight for driving, and to "off" position wherein said belt is loose for non-driving, said belt tightener comprising a rocking arm pivoted on said main frame and supporting one end of said belt transmission, a foot pedal and means operated thereby to shift said belt tightener to its "on" position, said means being operable by said guiding handle to shift said belt tightener to its "off" position.

10. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said shafts, a belt tightener shiftable to "on" position wherein said belt is tight for driving, and to "off" position wherein said belt is loose for non-driving, said belt tightener comprising a rocking arm pivoted on said main frame and carrying one end of said belt transmission, a pivoted latch carried by said arm, a keeper on said main frame for said latch, said latch adapted to swing said rocking arm into "on" position when moved into holding engagement with its keeper, a foot pedal operable to move said latch into said holding engagement, and said latch being positioned for operation by said guiding handle to release said latch from said holding engagement with its keeper during the lowermost part of the downward movement of said handle and thereby allow said rocking arm to swing to its "off" position.

11. Control mechanism for the belt transmission of power driven lawn mowers and the like comprising in combination, a wheel supported main frame, a guiding handle pivotally connected to said frame for free swinging movement between up and down positions, said frame carrying thereon a motor and its drive shaft and also carrying a driven shaft with belt and pulley transmission between said shafts, a belt tightener shiftable to "on" position wherein said belt is tight for driving, and to "off" position wherein said belt is loose for non-driving, said belt tightener comprising a rocking arm pivoted on said main frame and carrying one end of said belt transmission, a pivoted latch carried by said arm, a keeper on said main frame for said latch, said latch adapted to swing said rocking arm into "on" position when moved into holding engagement with its keeper, a foot pedal operable to move said latch into said holding engagement, said latch being positioned for operation by said guiding handle to release said latch from the holding engagement with its keeper during the lowermost part of the downward movement of said handle and thereby allow said rocking arm to swing to its "off" position, an integral extension on said foot pedal forming a hook and stop means on the guiding handle engageable by said hook for limiting the upward swinging movement of said handle when said foot pedal is not depressed, the depression of said foot pedal carrying its hook out of the path of the stop means on said handle whereby the latter may be raised to vertical position with respect to said machine.

WILFRED I. SMITH.

REFERENCES CITED

The following references are of record in the file of this patent:

UNITED STATES PATENTS

| Number | Name | Date |
|---|---|---|
| 2,151,659 | Funk | Mar. 21, 1939 |
| 2,247,333 | Funk | June 24, 1941 |